United States Patent [19]

Otsuki

[11] Patent Number: 4,646,247

[45] Date of Patent: Feb. 24, 1987

[54] NUMERICAL CONTROL APPARATUS WITH GRAPHIC STORED STROKE LIMIT CHECK FUNCTION

[75] Inventor: Toshiaki Otsuki, Hino, Japan

[73] Assignee: Fanuc Ltd., Minamitsuru, Japan

[21] Appl. No.: 705,427

[22] PCT Filed: Jun. 16, 1984

[86] PCT No.: PCT/JP84/00316

§ 371 Date: Feb. 12, 1985

§ 102(e) Date: Feb. 12, 1985

[87] PCT Pub. No.: WO85/00063

PCT Pub. Date: Jan. 3, 1985

[30] Foreign Application Priority Data

Jun. 17, 1983 [JP] Japan .................................. 58-107624

[51] Int. Cl.[4] ............................................. G06F 15/46
[52] U.S. Cl. .................................... 364/474; 318/626;
364/171; 364/184
[58] Field of Search ................ 364/474, 475, 162–171,
364/191–193, 184, 185; 318/626, 563, 565

[56] References Cited

U.S. PATENT DOCUMENTS

| 4,481,568 | 11/1984 | Inaba et al. ..................... 364/474 X |
| 4,482,968 | 11/1984 | Inaba et al. ..................... 364/474 X |
| 4,489,377 | 12/1984 | Mawyer et al. ................ 364/171 X |
| 4,513,366 | 4/1985 | Munekata et al. ............. 364/474 X |
| 4,521,860 | 6/1985 | Kanematsu et al. ........... 364/171 X |
| 4,530,046 | 7/1985 | Munekata et al. ............. 364/171 X |

Primary Examiner—Joseph Ruggiero
Attorney, Agent, or Firm—Staas & Halsey

[57] ABSTRACT

A numerical control apparatus wherein a stored stroke limit range is displayed (S1) on a graphic display unit. An NC machining program is read out block by block to draw a locus of a tool on the graphic display unit (S2, S3, S4). The drawing is stopped and a message is displayed (S8) when the locus of the tool falls outside (S5) the stored stroke limit range.

7 Claims, 3 Drawing Figures

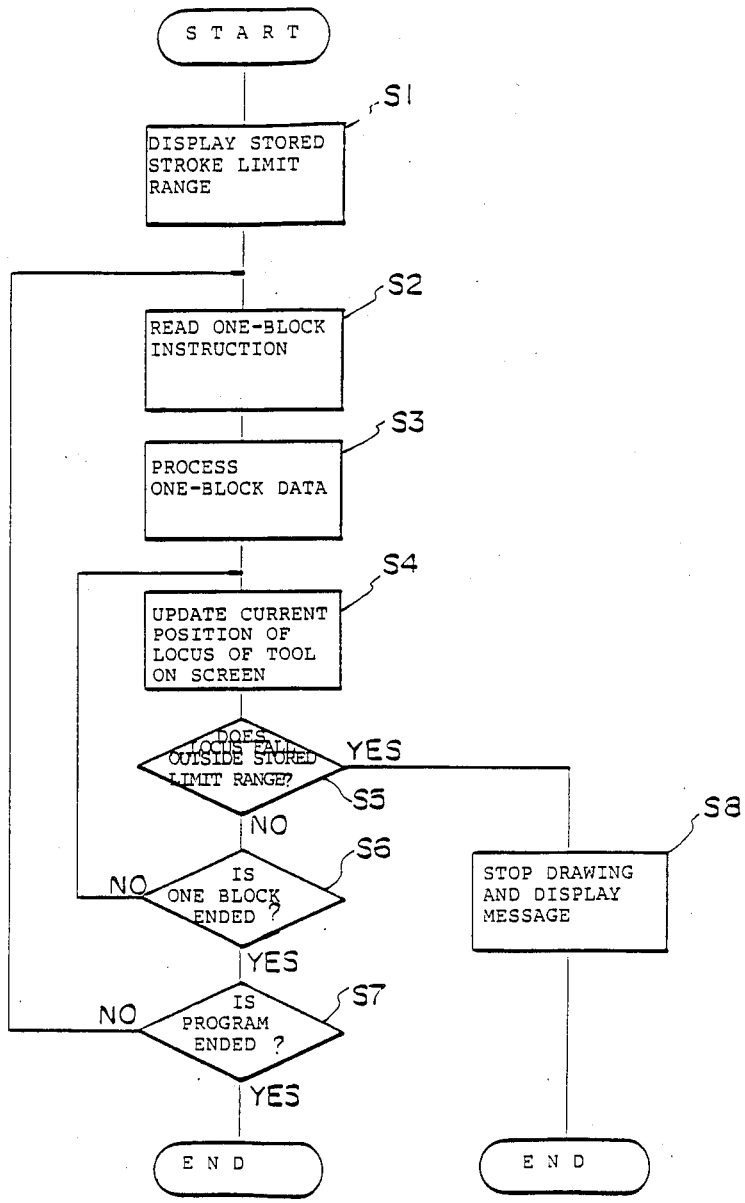

NUMERICAL CONTROL APPARATUS WITH GRAPHIC STORED STROKE LIMIT CHECK FUNCTION

BACKGROUND OF THE INVENTION

The present invention relates to a numerical control apparatus for performing a stored stroke limit function by graphic display to check a region into which a tool of a machine tool or the like cannot be moved.

A conventional numerical control apparatus has a stored stroke limit check function for checking a region into which a tool of a machine tool or the like cannot be moved. This function can be performed when the tool cannot be actually moved into a region upon reception of an NC machining program instruction. In such a case, unless machining is actually performed, the control apparatus cannot determine whether or not this particular NC machining program instruction represents a region into which the tool cannot be moved, resulting in inconvenience.

SUMMARY OF THE INVENTION

It is an object of the present invention to resolve the conventional drawback described above, and to provide a numerical control apparatus with a graphic stored stroke limit check function so as to check a stored stroke limit by utilizing a graphic display unit.

It is another object of the present invention to provide a numerical control apparatus with a stored stroke check function, wherein an alarm is generated when a locus of a tool which is drawn on a screen exceeds a stored stroke limit.

In order to achieve the above objects of the present invention, there is provided a numerical control apparatus comprising: means for inputting a stored stroke limit range; storage means for storing the stored stroke limit range entered by the input means and an NC machining program; graphic processing means for reading out the stored stroke limit range and the NC machining program from the storage means, and for causing a graphic display unit to display the stored stroke limit range and a locus of a tool; and stored stroke limit determining means for determining whether or not the locus of the tool falls within the stored stroke limit range, whereby drawing on the locus of the tool is stopped when the locus of the tool falls outside the stored stroke limit range, a message is displayed on the graphic display unit, and a lamp is turned on or an alarm sound is generated, thereby signalling to an operator that the NC machining program represents the region into which the tool is not to be moved.

According to the present invention, since the stored stroke limit range and the locus of the tool which is traced by the NC machining program are displayed on the graphic display unit, the operator can easily know a block of the NC machining program in which the locus of the tool falls outside the stored stroke limit. In this manner, actual machining need not be performed, and machining efficiency of the machine tool or the like under the control of the numerical control apparatus can be greatly improved.

BRIEF DESCRIPTION OF THE DRAWINGS

FIG. 2 is a flow chart for explaining the operation of the apparatus of FIG. 1.

DETAILED DESCRIPTION OF THE PREFERRED EMBODIMENT

Figure 1:
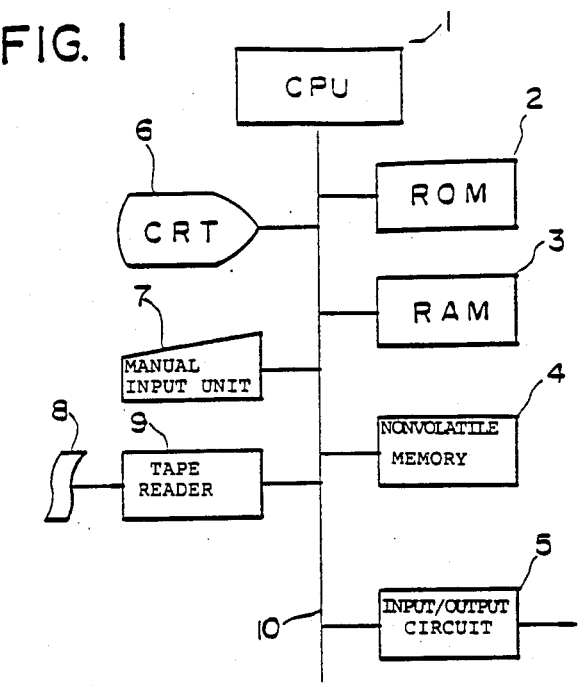
FIG. 1 is a block diagram of a numerical control apparatus according to an embodiment of the present invention.

FIG. 1 is a block diagram of a numerical control apparatus according to an embodiment of the present invention. Referring to FIG. 1, reference numeral 1 denotes a central processing unit (to be referred to as a CPU hereinafter); 2, a ROM for storing a control program for controlling the overall operation of the numerical control apparatus; 3, a RAM for storing processed results for arithmetic operations or the like; and 4, a nonvolatile memory used as storage means for storing an NC processing program and a stored stroke limit range. Reference numeral 5 denotes an input/output circuit connected to a servo motor or the like, in a machine tool or the like; 6, a graphic display unit for displaying the stored stroke limit range, a locus of a tool and a machining shape; 7, a manual input unit serving as stored stroke limit input means for inputting the stored stroke limit range or the like; and 8, an NC tape on which the NC machining program is written. The NC machining program is read by a tape recorder 9 and is stored in the nonvolatile memory 4. The control program stored in the CPU 1 and the ROM 2 and the RAM 3 constitute graphic processing means and stored stroke limit determining means so as to display the locus of the tool and the stored stroke limit range on the graphic display unit 6 in accordance with the NC machining program and the stored stroke limit range stored in the nonvolatile memory 4.

The stored stroke limit range input can be entered by the NC tape 8. Reference numeral 10 denotes a bus.

Figure 3:
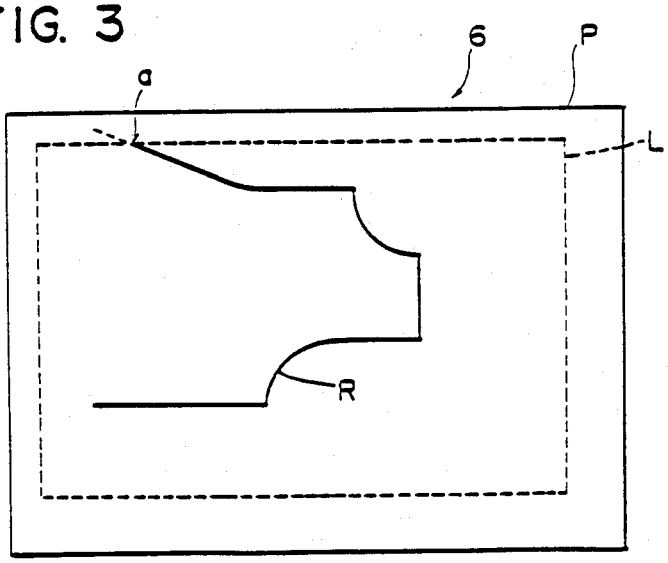
FIG. 3 is a representation of actual display on the graphic display unit.

FIG. 2 is a flow chart for explaining the operation of the apparatus shown in FIG. 1, and FIG. 3 shows a display example on the graphic display unit 6.

The operation of this embodiment will be described hereinafter. The stored stroke limit range is entered at the manual input unit 7 or by the NC tape 8 and is stored in the nonvolatile memory 4. For example, X-axis maximum and minimum values, Y-axis maximum and minimum values, and Z-axis maximum and minimum values are entered to define the stored stroke limit range.

The NC machining program is read from the NC tape 8 and stored in the nonvolatile memory 4. The NC machining program need not be stored in the nonvolatile memory 4. In this case, the NC machining program is read by the taper reader 9 block by block. When the operator depresses the graphic key in the manual input unit 7, the CPU 1 reads out the stored stroke limit range from the nonvolatile memory 4. As shown in FIG. 3, the stored stroke limit range represented by L on a screen P of the graphic display unit 6 is displayed (step S1). In this embodiment, the stored stroke limit range is displayed by a dotted line. A one-block instruction of the NC machining program is read (step S2), dots are displayed to correspond to the locus of the tool which is designated by this block (step S3). A current position of the locus of the tool is illuminated on the screen P of the graphic display unit 6 (step S4). The CPU 1 checks in step S5 whether or not the current position of the locus of the tool falls outside the stored stroke limit range. If NO in step S5, the CPU 1 then checks in step S6 whether or not the position designated by the one-block instruction is updated. If NO is step S6, the operation in step S4 is performed. In other words, the current position of the locus of the tool is updated on the screen of the graphic display unit 6. In this manner, when drawing of the position designated by the one-block instruction is completed, the next block instruction is read (step S2) if the NC program is not ended (steps S6 and S7). The operation in steps S3 to S6 is repeated again. Thereafter, the same operation as described above is performed. When the locus R of the tool is kept within the stored stroke limit range until the program is ended, the display of the locus of the tool on the graphic display unit 6 is ended. However, as indicated by a point a of FIG. 4, if the locus of the tool falls outside the stored stroke limit range (step S5), the CPU 1 signals to the operator that the locus of the tool falls outside the stored stroke limit range (step S8), thereby stopping drawing of the locus of the tool. In this case, signaling may be performed by a bell, a lamp or the like.

What is claimed is:

1. A numerical control apparatus for use in a machine tool having a limited tool movable range defined by its own structure, only where a tool mounted thereon is movable, comprising:

a graphic display unit for displaying a locus of a tool;
   means for inputting a stored stroke limit range representative of a limit of the limited tool movable range of said machine tool;
   storage means for storing the stored stroke limit range entered by said input means and an NC machining program;
   graphic processing means for reading out the stored stroke limit range and the NC machining program from said storage means, and for causing said graphic display unit to display the stored stroke limit range and to draw the locus of the tool; and
   stored stroke limit determining means for determining whether or not the locus of the tool falls within the stored stroke limit range, for stopping the drawing of the locus of the tool and for causing an error message to be displayed on said graphic display unit when the locus of the tool falls outside the stored stroke limit range, so that the NC machining program is prevented from containing an instruction for moving the tool mounted on said machine tool outside of the limited tool movable range of said machine tool.

2. An apparatus according to claim 1, wherein the message comprises a visual indication displayed on said graphic display unit, and wherein the visual indication represents that the locus of the tool falls outside the stored stroke limit range.

3. An apparatus according to claim 1, wherein said stored stroke limit determining means also causes an alarm sound to be generated when the message is displayed.

4. An apparatus according to claim 1, wherein said graphic display unit includes an alarm lamp for displaying the message.

5. A method of checking a stored stroke limit for a numerical control apparatus for use in a machine tool having a limited tool movable range defined by its own structure, only where a tool mounted thereon is movable, and having a graphic stored stroke limit check function, comprising the steps of:

(a) storing an NC machinig program and a stroke limit range representative of a limit of the limited tool movable range of the machine tool;
   (b) reading out the stored stroke limit range and the NC machining program;
   (c) automatically displaying the stored stroke limit range and a tracing of the locus of a tool which is to be controlled in accordance with the NC machining program;
   (d) automatically determining whether the locus of the tool falls within the stored stroke limit range; and
   (e) automatically stopping the tracing of the locus of the tool and generating a signal when the locus of the tool falls outside the stored stroke limit range, so that the NC program is prevented from including an intruction for moving the tool mounted on the machine tool outside of the limited tool movable range of the machine tool.

6. A method according to claim 5, wherein said step (e) comprises generating a visual message which is displayed.

7. A method according to claim 5, wherein said step (e) comprises generating an alarm sound.

* * * * *